(12) United States Patent
Moroney

(10) Patent No.: US 7,532,759 B2
(45) Date of Patent: May 12, 2009

(54) METHOD, SYSTEM AND COMPUTER SOFTWARE PRODUCT FOR SELECTING ELEMENTS OF A DIGITAL IMAGE

(75) Inventor: Nathan M. Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 722 days.

(21) Appl. No.: 11/285,850

(22) Filed: Nov. 22, 2005

(65) Prior Publication Data

US 2007/0116353 A1     May 24, 2007

(51) Int. Cl.
*G06K 9/62*      (2006.01)
(52) U.S. Cl. .................. 382/224; 382/159; 382/218; 382/170
(58) Field of Classification Search ........... 382/224, 382/165, 190, 159, 218, 170; 345/581; 709/224, 709/227, 228
See application file for complete search history.

(56) References Cited

U.S. PATENT DOCUMENTS 7,185,081 B1 *   2/2007   Liao ............................ 709/224
7,188,168 B1 *   3/2007   Liao ............................ 709/224

* cited by examiner

*Primary Examiner*—Anh Hong Do

(57) ABSTRACT

A method and system for selecting image elements, such as image pixels or vectors, of a digital image provide a set of lexical classifiers, such as a set of color names, which characterize a visual attribute of the image elements such as color. A lexical classifier is assigned to each image element, e.g. by a transform between the image element color values under the original numerical color encoding model of the image and the set of lexical classifiers. A reference lexical classifier is selected, e.g. by selecting an image element and determining its associated lexical classifier, and the image elements are then selected if their lexical classifier corresponds to the reference lexical classifier. The selected image elements may then be acted on as a group.

20 Claims, 3 Drawing Sheets

METHOD, SYSTEM AND COMPUTER SOFTWARE PRODUCT FOR SELECTING ELEMENTS OF A DIGITAL IMAGE

FIELD OF THE PRESENT INVENTION

The present invention relates generally to the processing and manipulation of a digital image, and more specifically relates to the selection of a sub-set of image elements from an image.

BACKGROUND OF THE PRESENT INVENTION

A common requirement in image editing or processing is to select a subset of pixels from an image, e.g. pixels that are of similar color. The selected pixels can then be processed together, e.g. to alter their color or to perform a copy command or a cut and paste command or the like.

Conventional approaches to color representation define a color in terms of co-ordinates in a color space. Known color encodings include for example RGB, SWOP, CYM(K), XYZ and CIELAB, with different encodings suited to different applications.

The RGB color model uses a rectangular co-ordinate system with an axis assigned to each of red, green and blue color components. These three components are termed 'additive primaries', as they are combined together to produce other colors. This model is used for example in CRT monitors and color raster graphics.

The CMY(K) color model is used primarily for printing and comprises cyan, magenta and yellow components, and often also uses a black component. These components are termed 'subtractive primaries' as one or more of these primaries are removed from white light to produce different colors.

In a typical process for selecting a sub-set of image pixels from a digital image, a user imports the image into an image processing program, and selects one of the pixels of the displayed image. The color attributes of the selected image pixel are determined, e.g. its RGB values, and all pixels in the image having the same RGB values to within a set tolerance are selected. The tolerance may be a number from 0 to 255 for RGB-coded images or from 0 to 100 for CYM(K)-coded images. The user can then act on the selected sub-set of pixels in whatever manner is desired.

These known selection processes however can be problematic, and it can be difficult for users to use these processes to accurately select the pixel sub-sets that they require. One problem for example is that a user may see little obvious relationship between a tolerance value and the pixel colors that the process will then select. Also, the pixel color ranges that are selectable are generally limited to regular geometric shapes within the color space.

The present invention aims to provide an alternative form of image element selection that, in its various embodiments, may have a number of advantages and may for example facilitate the automatic selection of pixels so as to conform well to a user's desired selection.

SUMMARY OF THE PRESENT INVENTION

Briefly, the present invention provides a method of selecting a sub-set of image elements from a digital image based on a visual attribute of the image elements. The method provides a set of lexical classifiers that characterize the visual attributes of the image elements of the image, and involves selecting a lexical classifier as a reference lexical classifier, and determining a lexical classifier for each of the image elements. The method compares the lexical classifier associated with each of the image elements with the reference lexical classifier, and selects an image element as part of the selected sub-set of image elements if the lexical classifier of the image element corresponds to the reference lexical classifier.

DETAILED DESCRIPTION OF EMBODIMENTS OF THE PRESENT INVENTION

Figure 1:
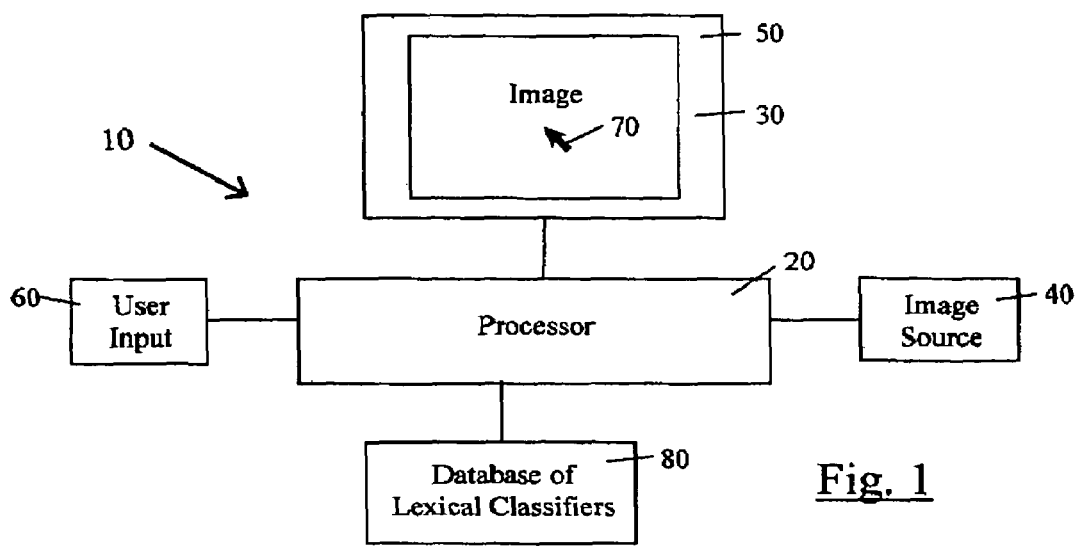
FIG. 1 is a schematic diagram showing system components according to an embodiment of the invention.

A computer system 10 in accordance with one embodiment is shown in FIG. 1, and includes a processor 20 for carrying out image editing and processing. The processor 20 imports a digital image 30 from an image source 40, displays it on a monitor screen 50 for editing purposes, and carries out user commands received through a user input device 60.

The image source 40 may take any suitable form, and could include for example a digital camera, an image scanner, or a data storage medium, such as a storage disc or solid-state memory, on which the image is recorded. The image source may be local or may be remote and connected via a network connection, e.g. the Internet. As well as being scanned or photographed, the image 30 may be generated in any other suitable manner, e.g. through being computer-generated or obtained from a calorimeter.

The image 30 will be composed of a plurality of image elements that may be individually operated on. These may include for example pixels of a raster image or vector elements of a vector image. They may also be termed PELS (picture elements).

Each of the image elements will be given a number of attribute values that may for example relate to their visual appearance, e.g. their color. These attributes may be defined by a number of encoding models. Standard color encoding models include for example RGB, SWOP, CMYK, XYZ and CIELAB. Thus, each image element may have a set of numbers associated with it that defines its color as a co-ordinate position within a color space.

A user may highlight and select parts of the displayed image 30, e.g. a set of image elements, using the user input device 60, e.g. a computer mouse that controls a cursor 70 or the like on the monitor screen 50. The user may also or alternatively make selections and provide instructions using other types of input device 60, such as a keyboard, stylus or touch screen, or in any other suitable manner.

Often, a user will wish to select a sub-set of image elements, so that these image elements can be acted on together, e.g. to copy them or to cut and paste them or to change one or more of their attributes, e.g. their color. Often the user will wish to select this sub-set based on a common image element attribute, such as similarity in color.

The computer system 10 allows a user to select image elements based on a visual attribute. The visual attribute may relate to any appropriate visual feature associated with the image elements. Color is one such visual attribute, and is the attribute mainly discussed herein. The embodiments may also however be applied to the selection of other visual attributes, e.g. texture, in a similar manner.

In accordance with the present embodiment, the system 10 facilitates selection of desired image elements by providing a set of lexical classifiers to characterize the visual attributes. The lexical classifiers may be for example a set of color names. The system associates each of the image elements with a lexical classifier, and selects image elements based on a comparison of their associated lexical classifiers with a reference lexical classifier.

The lexical classifiers may be stored in a database 80, and the database may define a transform between the lexical classifiers and a number of standard color space encodings that may be associated with the input digital image 30. This allows the processor 20 to determine the lexical classifier appropriate to each image element according to the color encoding scheme used by the image and the specific color encoding values of each image element.

The lexical classifiers may take a number of forms. In one form they correspond to a set of basic color names, for example red, green, yellow, blue, brown, pink, orange, purple, white, gray and black, or a sub-set thereof. Each of these basic color names may represent a relatively large region of an associated color space. The lexical classifiers may also or alternatively include more specific color names each of which defines a relatively narrow region of the color space. These more specific lexical classifiers may include for example peach, beige, crimson or the like.

The lexical classifiers may also include modifiers that modify the regions of the color space to which the color names relate, so as to further define the color of an image element. These modifiers may be general modifiers, such as light, dark, strong, dull, pastel or the like, or may be color specific, e.g. royal, as in royal purple.

The database of lexical classifiers, and the transforms between them and standard encoding regimes, may be compiled by collecting color names and modifiers from a large number of people and by questioning people with regard to color samples and the appropriate descriptions for them. Machine learning and statistical pattern recognition algorithms may then be used to determine patterns within the resultant data and to define relationships between the classifiers and the standard numerical encoding systems. These algorithms may for example implement nearest neighbor assignments, fuzzy logic and/or classical logic.

The provision of lexical classification systems and the provision of modifiers, including dynamic modifiers, are described in co-pending US patent applications (numbers to be inserted) entitled 'An Adaptive Lexical Classifier System' and 'A Lexical Classification System with Dynamic Modifiers' filed on (dates to be inserted), the contents of which are incorporated herein in their entirety by reference.

The reference lexical classifier by which image element selection is made may be determined in any suitable manner. It may for example be keyed in by a user or selected from a displayed palette of colors. In one embodiment, a user selects an image element in the displayed image 30, and the processor 20 determines the reference lexical classifier from the color attribute of the selected image element, e.g. it determines the RGB values for the selected image element and looks up the corresponding lexical classifier in the database 80.

The user may also select more than one image element, and the attributes of these image elements may then be used to set a reference lexical classifier. For example, if a number of image elements are selected, the system may determine the range of attribute values associated with the image elements, and may use a basic lexical classifier as a reference if the color range is large and a more specific lexical classifier as a reference if the color range is small.

Generally, a single lexical classifier may be used as a reference for selecting the image elements. It is also possible however to specify more than one lexical classifier as a reference. For example, the reference lexical classifiers may include a range of lexical classifiers between two or more specified lexical classifiers. Selection of an image element may then depend on its associated lexical classifier corresponding to one or more of these reference classifiers.

An image element may be selected only if its lexical classifier is a match for the reference lexical classifier, i.e. identical to it. In other embodiments however, an image element may be selected if it corresponds to the reference lexical classifier to an appropriate degree of closeness. Generally, a match is sufficient given that a lexical classifier defines a region of color space rather than a single point, and the region size may be varied dependent on the specificity of the lexical classifier.

The set of lexical classifiers that is chosen to characterize the attribute, e.g. color, may be determined by the reference lexical classifier. For example, if a basic color name is chosen as the reference lexical classifier, then the system may determine the color of each image element based on the set of basic color names, whereas, if a more specific color name is chosen or if a modifier is used, then the system may determine the color of each image element based on a more specific set of color names and modifiers. Thus, the classifier set may change resolution dependent on the need. The user may also select which lexical classifier set to use or the system may do so automatically based on one or more preset criteria, e.g. the range of colors in the overall image. The database 80 may therefore be made adaptive to allow for alterations in the lexical classifier set and in its resolution.

Once all of the image elements having the desired lexical classifier or classifiers have been chosen, the processor may display the image 30 on the screen 50 with the sub-set of selected image elements highlighted in an appropriate fashion, e.g. colored in accordance with the reference classifier. For example, the color of the selected pixels may be set to the color of a single color space point in the image's basic color space (e.g. the RGB color space), the color space point preferably being associated with some average of the points in the color space region associated with the reference color name.

Figure 2:
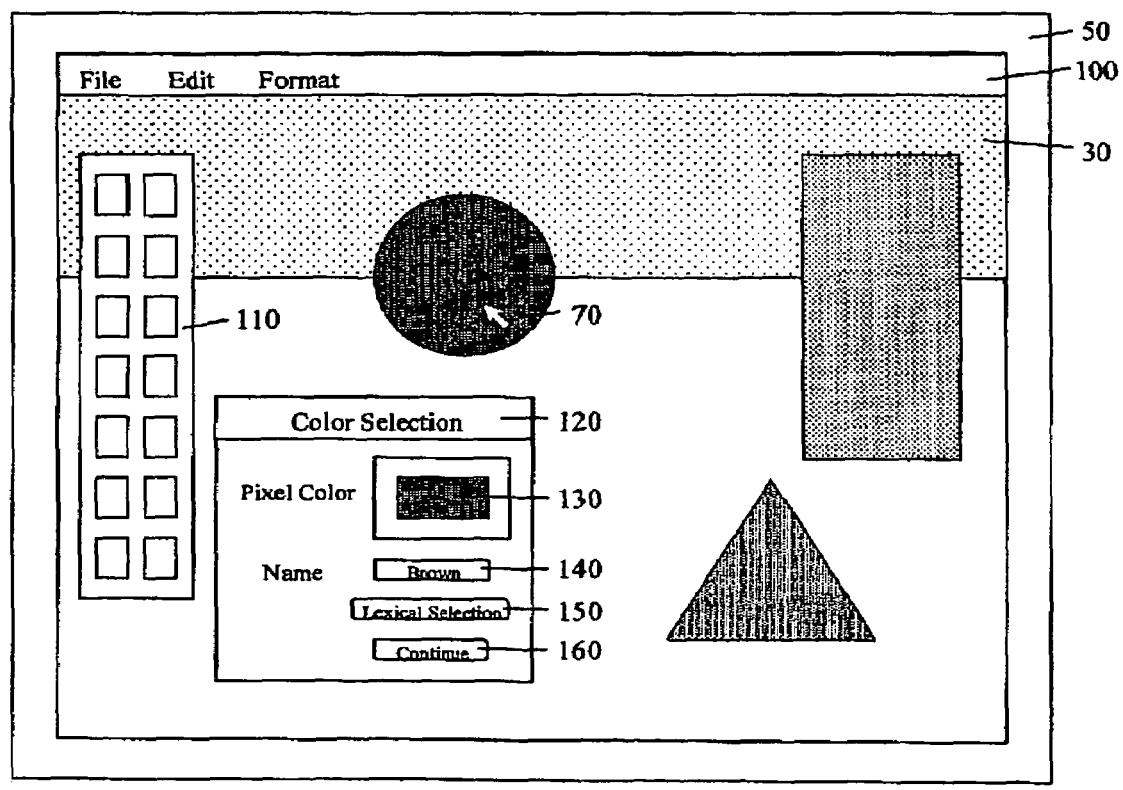
FIG. 2 is a flow-chart showing a process for selecting image elements according to an embodiment of the present invention.

FIG. 2 shows a flowchart of a process for selecting image elements according to an embodiment. Thus, in one embodiment, an image element selection process may be put into effect by the processor 20 of FIG. 1 running software that incorporates routines executing in the manner shown in FIG. 2.

In step S210, an appropriate set of lexical classifiers is chosen for the image. Next, in step S220, a reference lexical classifier is chosen for use in the selection of the sub-set of image elements. At step S230, each image element is assigned one of the lexical classifiers from the set of lexical classifiers, and, at step S240, the lexical classifier of each of the image elements is compared to the reference lexical classifier. At step S250, the process selects an image element for the sub-set of image elements if the lexical classifier for the image element corresponds to the reference lexical classifier.

Once this process is complete, the resulting sub-set of image elements may be acted on in any suitable manner. The sub-set of image elements may be highlighted within the image 30, and the sub-set may be cut, copied, altered, moved or have any other appropriate processing applied to it.

Figure 3:
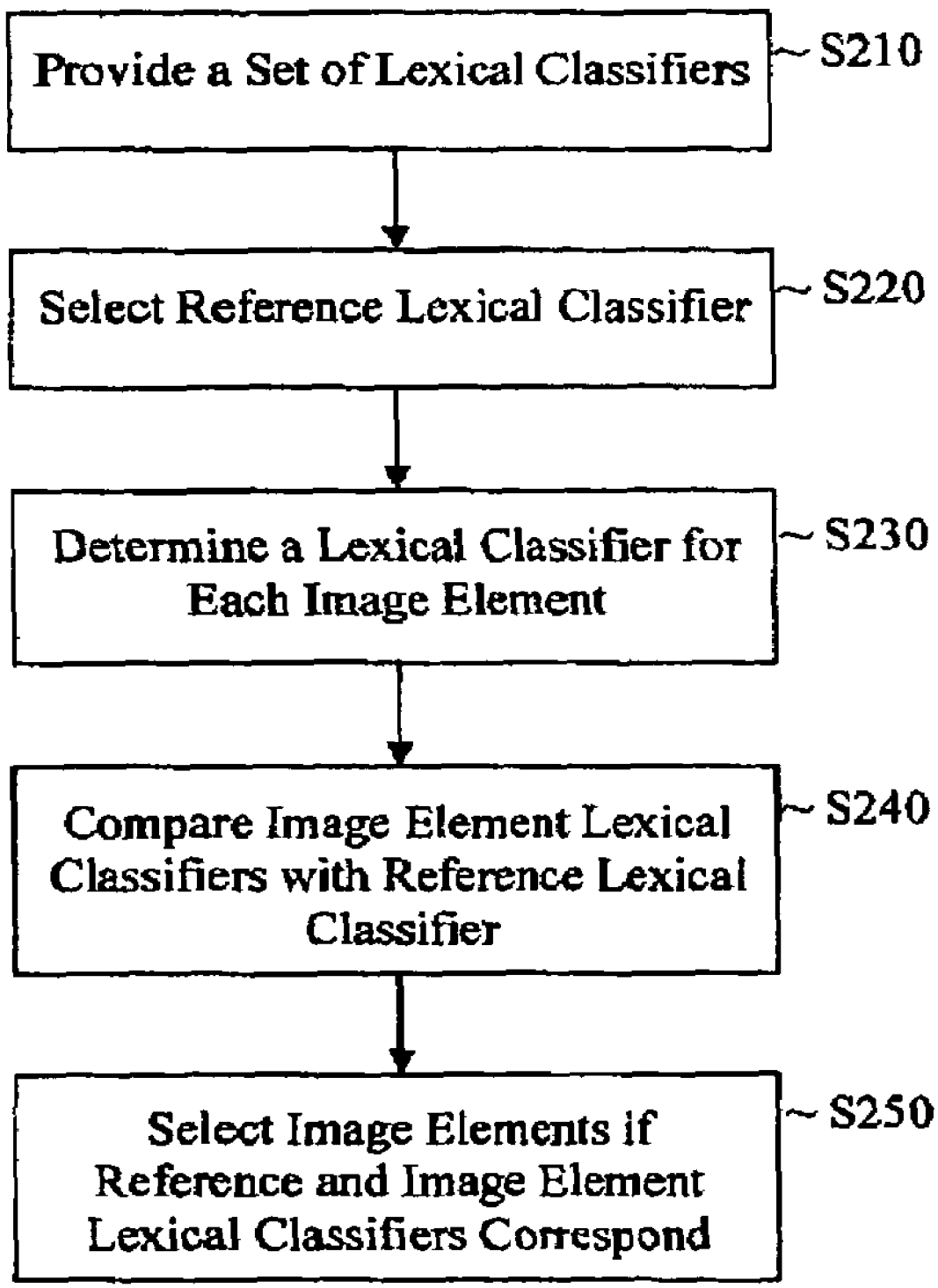
FIG. 3 is a flow-chart showing a process for selecting image elements according to an embodiment of the present invention.

FIG. 3 is a process flow-chart of a further selection process that may be run by the processor 40. In step S310, an input device is monitored to determine a manual selection of an image element, e.g. through a mouse, keyboard or the like. In step S320, the color name of the selected image element is determined using an adaptive lexical classification system based on data in the classification database 80.

In step S330, a program loop is entered in which, for each image element in the digital image, the color name of the image element is determined in step S340 (again using the adaptive lexical classification system) and a comparison of the image element's color name with that of the reference image element is made in step S350.

In step S360, the currently examined image element is added to the sub-set of selected image elements if its color name matches that of the reference color name, whereas, in step S370, the currently examined image element is disregarded if there is no match.

The program loop is exited at S380 if there are no further image elements to monitor, or the program loops back to step S330 if further image elements are still to be compared.

At step S390, the digital image under processing is displayed with the appropriate image elements shown as selected. Selection may be shown by e.g. flagging the selected image elements (e.g. with a single color corresponding to the reference color name) and by desaturating the other image elements, e.g. by darkening them and lowering their contrast.

The selection processes may of course vary from the forms shown, and may include further steps and/or may change the order of the steps. For example, further selection criteria may be included, such as requiring that the image elements be continuous with the user-selected image element or that they fall within a pre-selected region of the overall image.

Figure 4:
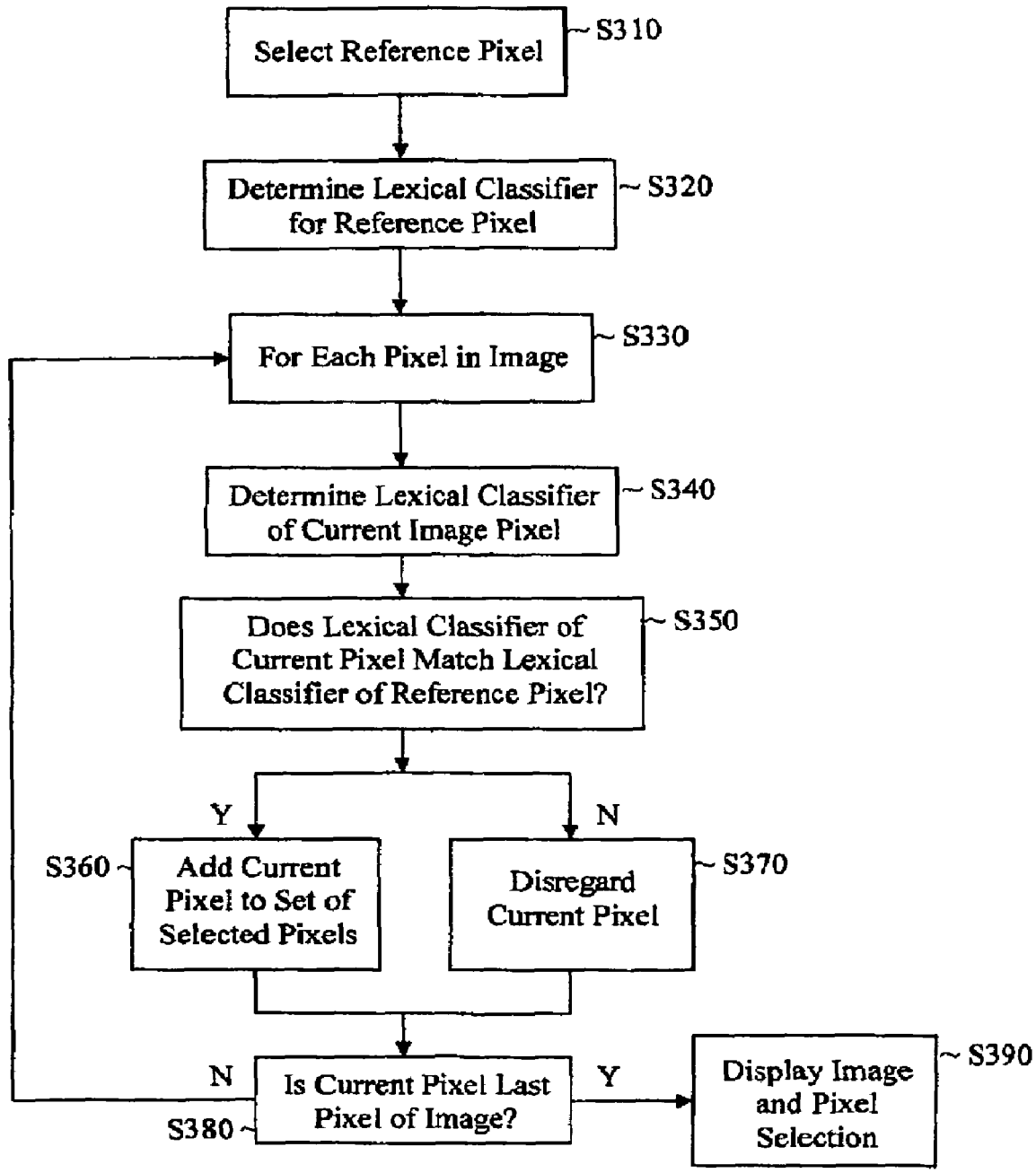
FIG. 4 is schematic of a screen-shot showing an image processing action according to an embodiment of the present invention.

FIG. 4 shows a screen-shot of a computer system running a program implementing an embodiment of the present image element selection process.

The digital image 30 is displayed within the window 100 of an image editing program in accordance with the standard numerical encoding algorithm that is associated with it, e.g. that it was created with, e.g. an RGB triplet. When a user wishes to select image elements based on color, they first click on the appropriate tool, e.g. a 'magic wand' tool, in the toolbar 110. This causes an image element selection routine to run such as shown in the flowchart of FIG. 2 or FIG. 3, and brings up the window 120.

When a user selects an image element from the image 30, e.g. by clicking on it with a cursor 70, the program obtains the color attribute of the image element, e.g. its RGB triplet, and determines a corresponding lexical classifier, e.g. color name, through the use of a classifier database. It then provides a sample 130 of a color (or range of colors) corresponding to the lexical classifier in the window 120, together with an identification of the lexical classifier, e.g. the basic color name "brown" in a box 140. A button 150 allows for access to the lexical classifiers e.g. to change the reference classifier or the set of classifiers used, and a button 160 allows the user to continue the routine and have the image editing program automatically generate the selection.

Once the appropriate sub-set of image elements is selected, they may be highlighted on the image 30, e.g. by being colored in the shown sample color of the lexical classifier and by desaturating the unselected image elements.

The described embodiments may have various advantages. They may allow for a more natural selection of image element colors than for example a selection based on an RGB triplet and a tolerance value, and the subset of image elements selected may more closely conform to a user's expectations.

The present embodiments can use image element color names as an intuitive modality to facilitate image element selection. They also allow for irregular color regions to be employed in the selection process, the regions being based on the preset complex boundaries of the color names. This can provide a more accurate capture of desired image elements, and can prevent image elements having undesired color characteristics from being caught in a selection.

In contrast, known pixel selection processes are often digital counts in a color space, and the color spaces used in the selection process are typically defined by an encoding triplet such as an RGB triplet with a single tolerance value that is added to and subtracted from the three components of the triplet. Such color space regions are generally limited to regular geometric shapes that cannot fully represent the color range that a user desires to select.

Also, when using standard encoding models and previously known selection processes, there may be little obvious relationship between an initial tolerance value and the colors that will be selected. A number of iterations of the tolerance value may therefore often be made before a user is satisfied with a selection.

Overall, enabling a user to issue selection instructions based on lexical classifiers may provide a more intuitive and better initial estimate of the similarly colored image elements that will be selected. Further, the ability to define irregular regions of color space allow for greater accuracy in the acceptance or rejection of image elements of similar colors.

The present embodiment may be used in relation to many image processing actions, and for example may provide a 'magic wand' tool or may be used in a 'replace color' command.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A method of selecting a sub-set of image elements of a digital image based on a visual attribute of the image elements, the method including the steps of:
    using a database for providing a set of lexical classifiers that characterize said visual attribute;
    using a processor for selecting a lexical classifier from said set of lexical classifiers as a reference lexical classifier;
    determining a lexical classifier for each of said image elements;
    comparing the lexical classifier associated with each of said image elements with the reference lexical classifier; and
    selecting an image element as part of said sub-set of image elements if the lexical classifier of said image element corresponds to the reference lexical classifier.

2. The method of claim 1, wherein said visual attribute is color.

3. The method of claim 1, wherein the image element is an image pixel.

4. The method of claim 1, wherein the image element is an image vector.

5. The method of claim 1, wherein the image is one or more of: a digital photograph, a digitally scanned image, and a computer-generated image.

6. The method of claim 1, wherein the step of selecting said reference lexical classifier includes the steps of:
- selecting at least one of the image elements as a reference image element;
- determining a lexical classifier for said reference image element; and
- setting said lexical classifier of said reference image element to said reference lexical classifier.

7. The method of claim 6, wherein said step of selecting said reference image pixel includes the step of:
- manually selecting an image element of said image as said reference image element.

8. The method of claim 6, wherein said visual attribute is defined by a numerical color encoding model that assigns each image element a point in a color space, and wherein the step of determining a lexical classifier for said reference image element includes the steps of:
- providing a transform between said numerical color encoding model and said set of lexical classifiers;
- determining the numerical color encoding model values for said reference image element; and
- transforming said numerical values to a lexical classifier using said transform.

9. The method of claim 1, wherein said set of lexical classifiers includes a set of basic lexical classifiers including the color names red, green, yellow, blue, brown, pink, orange, purple, white, gray and black or a sub-set thereof.

10. The method of claim 1, wherein said lexical classifiers define regions of a visual attribute space, and including the step of:
- providing a set of lexical modifiers for modifying the regions of the attribute space that said lexical classifiers define.

11. The method of claim 1, wherein said lexical classifiers are determined by collecting and analyzing data regarding the naming of sample images of different visual attribute values.

12. The method of claim 1, wherein said lexical classifier of an image element is determined to correspond to said reference lexical classifier when said lexical classifier of said image element matches said reference lexical classifier.

13. The method of claim 1, wherein two or more lexical classifiers are selected as reference lexical classifiers, and wherein an image element is selected when the lexical classifier of said image element corresponds to a reference lexical classifiers within a set of lexical classifiers defined by said two or more reference lexical classifiers.

14. The method of claim 1, including selecting a lexical classifier set from a number of sets of differing resolution.

15. An image processing system for selecting a sub-set of image elements of a digital image based on a visual attribute of the image elements, including:
- a database of lexical classifiers that characterize said visual attribute; and
- a processor for:
- selecting a lexical classifier as a reference lexical classifier;
- determining a lexical classifier for each of said image elements;
- comparing the lexical classifier associated with each of said image elements with said reference lexical classifier; and
- selecting an image element as part of said sub-set of image elements if the lexical classifier of said image element corresponds to the reference lexical classifier.

16. The system of claim 15, wherein said processor sets a manually selected image element as a reference image element and determines a reference lexical classifier based on an attribute value of the reference image element.

17. The system of claim 15, wherein said processor selects an image element as part of said sub-set of image elements if the lexical classifier of said image element is identical to the reference lexical classifier.

18. The system of claim 15, wherein said database is scalable to provide sets of lexical classifiers of differing resolution.

19. A computer software product including a computer-readable media having stored thereon computer software for selecting a sub-set of image elements of a digital image based on a visual attribute of the image element, the computer software, when run on a computer system, being configured to perform the steps of:
- using a database for providing a set of lexical classifiers that characterize said visual attribute;
- using a processor for:
- selecting a lexical classifier as a reference lexical classifier;
- determining a lexical classifier for each of said image elements;
- comparing the lexical classifier associated with each of said image elements with the reference lexical classifier; and
- selecting an image element as part of said sub-set of image elements if the lexical classifier of said image element corresponds to the reference lexical classifier.

20. The computer software product of claim 19, wherein said step of selecting one of said lexical classifiers as a reference lexical classifier, includes the step of setting the lexical classifier of a manually selected image element as the reference lexical classifier.

* * * * *

UNITED STATES PATENT AND TRADEMARK OFFICE
CERTIFICATE OF CORRECTION

| | |
|---|---|
| PATENT NO. | : 7,532,759 B2 |
| APPLICATION NO. | : 11/285850 |
| DATED | : May 12, 2009 |
| INVENTOR(S) | : Nathan M. Moroney |

It is certified that error appears in the above-identified patent and that said Letters Patent is hereby corrected as shown below:

In column 2, line 38, delete "calorimeter" and insert -- colorimeter --, therefor.

In column 6, line 49, in Claim 1, after "for" insert -- : --.

Signed and Sealed this

Thirtieth Day of March, 2010

David J. Kappos
*Director of the United States Patent and Trademark Office*